US006205323B1

(12) United States Patent
Mayo, Jr.

(10) Patent No.: US 6,205,323 B1
(45) Date of Patent: Mar. 20, 2001

(54) JURY PAGING SYSTEM

(76) Inventor: Howard A. Mayo, Jr., 2051 Log Cabin Rd., York, PA (US) 17404

( * ) Notice: Subject to any disclaimer, the term of this patent is extended or adjusted under 35 U.S.C. 154(b) by 0 days.

(21) Appl. No.: 09/206,988

(22) Filed: Dec. 8, 1998

(51) Int. Cl.[7] ........ H04B 7/00

(52) U.S. Cl. ........ 455/38.2; 455/38.1; 340/825.44; 340/311.1

(58) Field of Search ........ 455/31.1, 32.1, 455/38.1–38.2, 38.4–38.5, 550, 566, 575; 340/311.1, 825.44

(56) References Cited

U.S. PATENT DOCUMENTS 4,882,579 * 11/1989 Siwiak ........ 455/31.3
5,153,582 * 10/1992 Davis ........ 340/825.44
5,594,409 * 1/1997 Shank ........ 340/326
5,978,770 * 11/1999 Waytena et al. ........ 705/5
6,014,429 * 1/2000 LaPorta et al. ........ 455/38.1

* cited by examiner

*Primary Examiner*—Doris H. To
(74) *Attorney, Agent, or Firm*—Aquilino, Welsh & Flaxman

(57) ABSTRACT

A jury paging notification system is disclosed. The system includes a plurality of juror pagers to be carried by potential jurors and a pager control panel monitoring each of the plurality of juror pagers. In use, potential jurors carrying a juror pager are permitted to go on with their regular lives and leave the courthouse based upon the understanding that attendance at a courthouse is required within a specified time period after being paged.

8 Claims, 6 Drawing Sheets

FIG. 1

PAGER DELIVERY RECORD

DATE ________

| NUMBER | TIME | ON TIME CHECK | SIGNATURE |
| --- | --- | --- | --- |
| 5 | to | | ________ |
| 8 | to | | ________ |
| 20 | to | | ________ |
| 27 | to | | ________ |
| 38 | to | | ________ |
| ETC. | to | | ________ |

BANK NAME ________________

FIG. 5

PAGER INSTRUCTIONS
PAGER NUMBER ___

YOU ARE RESPONSIBLE FOR CARE AND OPERATION OF THIS PAGER.

1. ACTIVATION MUST OCCUR WITHIN 5 MINUTES OF SPECIFIED PICK-UP TIME. THIS PAGER MUST BE WITH YOU OR WITHIN YOUR HEARING AT ALL TIMES.

2. WHEN PAGED YOU MUST ACKNOWLEDGE (TURN SWITCH TO ON) WITHIN 5 MINUTES AND PROCEED IMMEDIATELY TO THE COURT HOUSE AT ________________ TO ARRIVE WITHIN ________ MINUTES. SHOULD THERE BE ANY DELAYS YOU MUST TELEPHONE THE COURT ADMINISTRATORS OFFICE ( ) ________ WITHIN YOUR TIME LIMIT TO AVOID ACTION BY THE SHERIFF'S OFFICE.

DATE ________

FIG. 6

JURY PAGING SYSTEM

BACKGROUND OF THE INVENTION

1. Field of the Invention

The invention relates to a jury paging system. More particularly, the invention relates to a jury paging system providing potential jurors with substantial freedom as they await notification whether their services will be required.

2. Description of the Prior Art

One of the hallmarks of our judicial system is the right to a trial before a jury of one's piers. As such, each citizen is required to give of his or her time and serve "jury duty". Most jurisdictions randomly call citizens to serve jury duty for a specified period of time. For example, many jurisdictions require those called for jury duty to serve one week or a trial. In these jurisdictions those called for jury duty must sit in the courthouse for a complete week to determine whether their services will be required. If their services are required, they are assigned to a trial and required to serve for the duration of the trial. If, however, their services are not required, they are released after spending an entire week in the courthouse.

While the requirement for such service is a cornerstone of our judicial system, the time spent awaiting a determination whether an individual will be needed for a trial is highly wasteful. For example, in York County, Pa., approximately 110–120 citizens for one week are randomly selected for jury duty when the courts are in session. Those called for jury duty are required to report at the courthouse for one week, unless they are assigned to a trial. After reporting for a full week those called for jury duty are released.

Once those citizens called for jury duty arrive at the specified time, they are immediately ready for jury duty. However, the courts are generally not ready to make an immediate determination as to whether their service will, in fact, be required. As such, these citizens may read, knit, talk quietly, use the available telephones or otherwise occupy their time for the six to eight hours per day they are required to spend at the courthouse waiting to find out whether their services will be required.

The 1998 court schedule for York County required that a jury pool of 120 persons be assembled for criminal court for two to three weeks during odd months, while a jury pool of 110 persons was assembled for civil court held during even months for two weeks. As will certainly be appreciated, the need for jury pools in our larger metropolitan areas is substantially greater.

The cost in time from work, parking, juror payments, employee replacements, supervision and administration is tremendous. A need, therefore, exists for an improved system through which citizens may serve jury duty in a more efficient manner. The present invention provides such a system.

SUMMARY OF THE INVENTION

It is, therefore, an object of the present invention to provide a jury paging notification system. The system includes a plurality of juror pagers to be carried by potential jurors and a pager control panel monitoring each of the plurality of juror pagers. In use, potential jurors carrying a juror pager are permitted to go on with their regular lives and leave the courthouse based upon the understanding that attendance at a courthouse is required within a specified time period after being paged.

It is also an object of the present invention to provide a jury paging notification system wherein turning on a specified one of the juror pagers signals the pager control panel that the specified juror pager has been turned on and is active.

It is another object of the present invention to provide a jury paging notification system wherein the pager control panel is activated to page a specified one of the juror pagers when that potential juror's attendance is required at the courthouse.

It is a further object of the present invention to provide a jury paging notification system wherein turning a specified one of the juror pagers off signals the pager control panel that the specified juror pager has been turned off, and such action indicates that the potential juror acknowledges receipt of a page and will return to the courthouse within the specified time period.

It is also an object of the present invention to provide a jury paging notification system comprising the steps of assigning a specified juror pager to each potential juror such that potential jurors are permitted to go on with their regular lives based upon the understanding that attendance at a courthouse is required within a specified time period after being paged, monitoring the juror pagers with a pager control panel, and paging potential jurors when their attendance at the courthouse is required.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 5 is a sample Pager Delivery Record form.

FIG. 6 is a sample Pager Instructions form.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
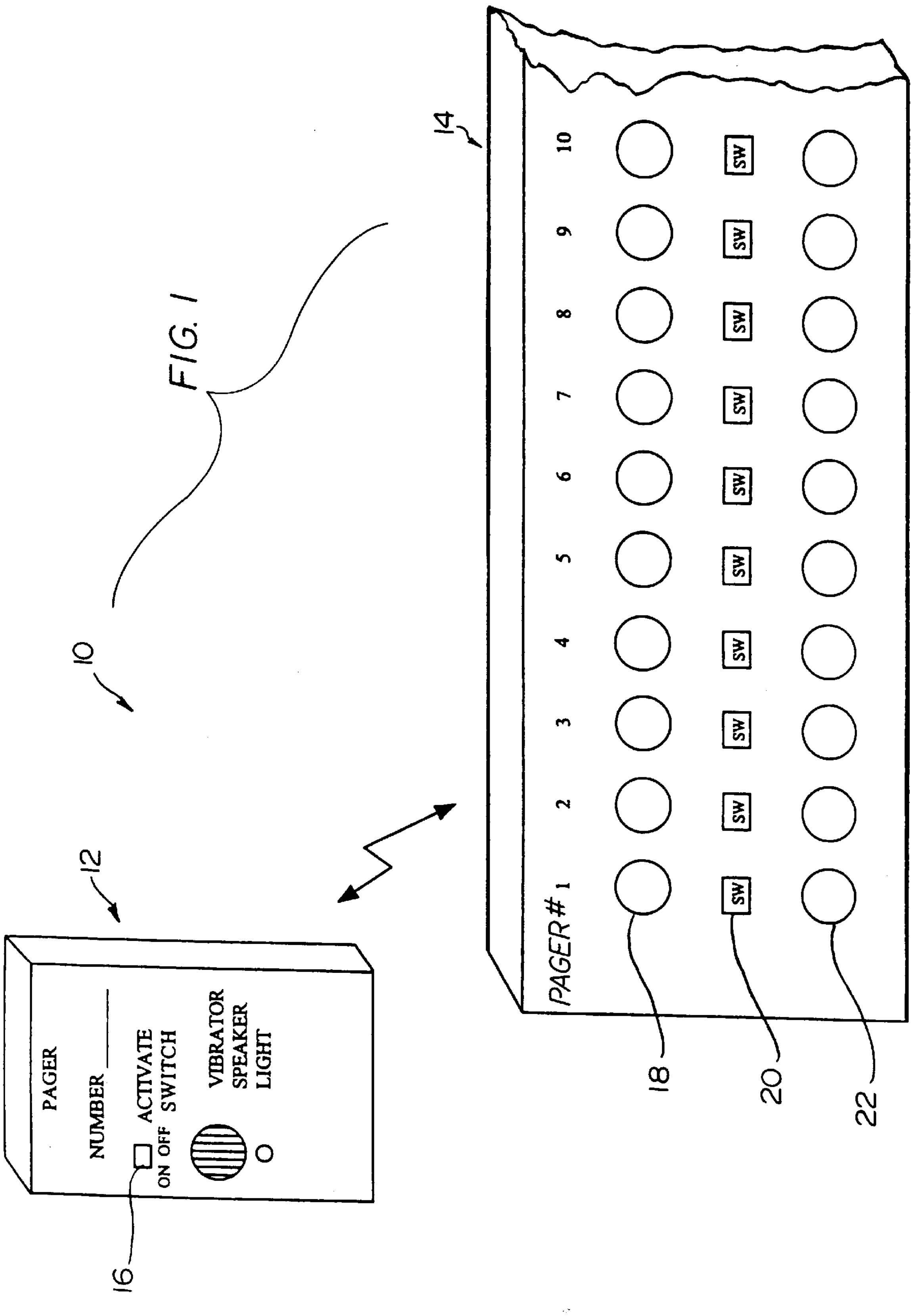
FIG. 1 is a schematic of the pager and Master Pager Control Panel used in accordance with the present invention.

The present jury paging system allows those called for jury duty to serve without requiring unnecessary attendance at the courthouse. Briefly, the system employs pagers 12 to notify those serving jury duty that their attendance is required at the courthouse. The system also employs a master pager control panel 14 to monitor the status of those individuals serving jury duty. The pager 12 and master pager control panel 14 shown in FIG. 1 allow potential jurors to go on with their regular lives while they await notification whether their presence is required at the courthouse. While the master pager control panel 14 includes 10 pager numbers, the master pager control panel 14 may be designed to accommodate a wide variety of pagers without departing from the spirit of the present invention.

The present jury paging system will now be described as it might be used in practice. The description will be based upon a system requiring attendance for a complete week. It should, however, be understood that the present system may be adapted for use with a variety of jury duty systems, without departing from the spirit of the present invention. For example, the present jury paging system may be adapted for use with those jury systems requiring only one or two days of service, without departing from the spirit of the present invention.

Figure 2:
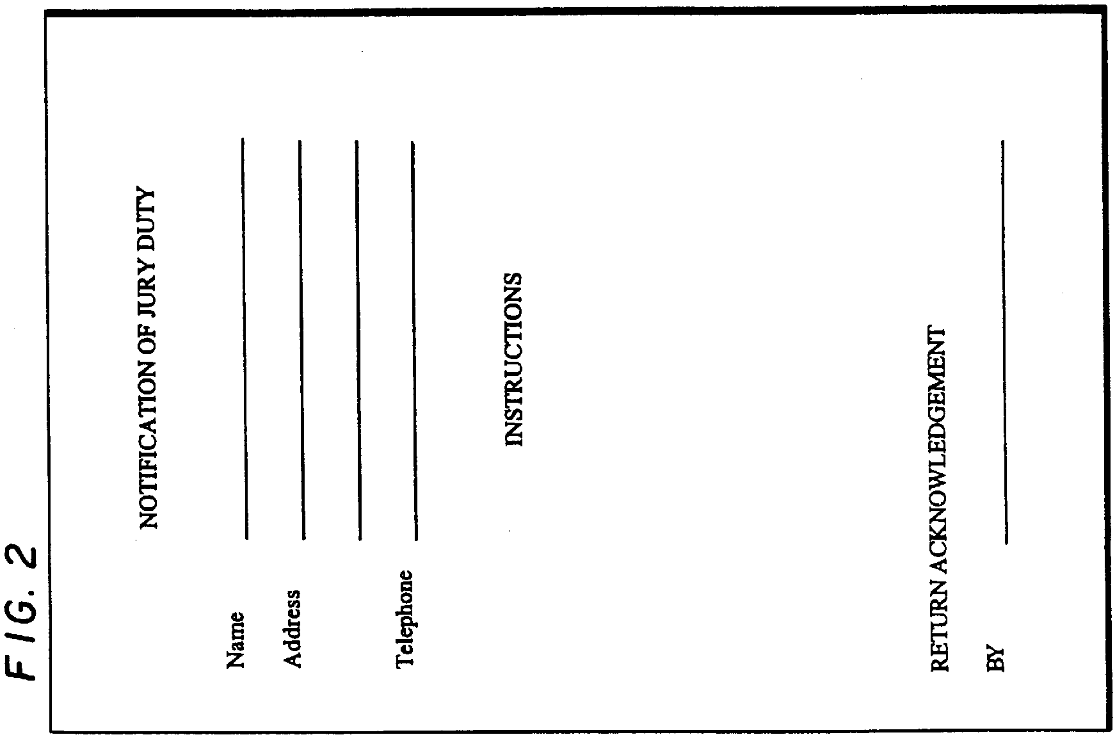
FIG. 2 is a sample Notification of Jury Duty form.

Those called for jury duty will first receive a written notification requiring their presence to serve jury duty for a specified time period. An exemplary notification to be used in accordance with the present invention is shown in FIG. 2. The notification will generally include the potential juror's name, address, phone number, and instructions for completing the Jury Duty Acknowledgment form within the time limits for return thereof.

Since a minimum number of potential jurors may be needed the first morning they are required to be available for jury duty, a predetermined number of selected jurors will be required to report for jury duty during the first morning they are required to be available for jury duty. For example, the needs of a particular courthouse may require that only 32 jurors be in attendance during the first morning of jury duty. The remaining potential jurors may remain on call in accordance with the jury paging system described below in detail.

Figure 3:
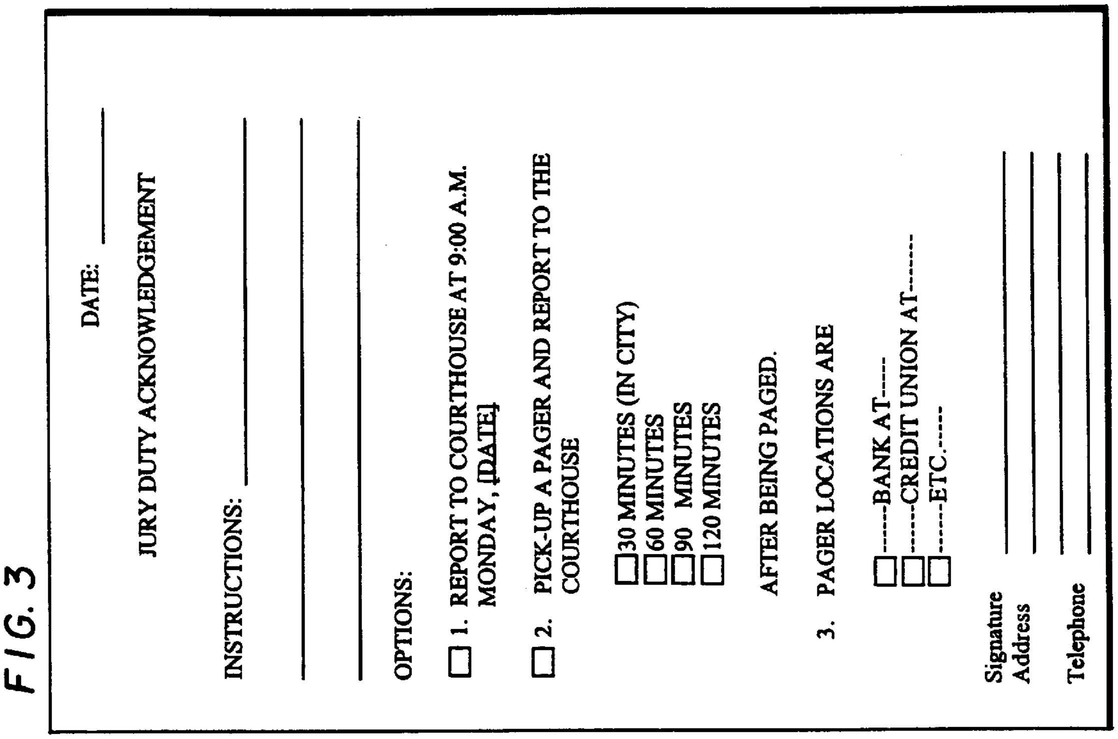
FIG. 3 is a sample Jury Duty Acknowledgment form.

With this in mind, each juror is required to complete a Jury Duty Acknowledgment form. For example, and as shown in FIG. 3, the Jury Duty Acknowledgment form includes instructions regarding attendance at jury duty, as well as options for use of the paging system. The options include "Report To Court House At 9:00 a.m. Monday, [Date For Attendance]" or "Pick Up A Pager And Report To The Court House __ Minutes After Being Paged". Additional instructions may read as follows, "Please select Option 1 or 2 by checking the desired box. Note that a minimum number of jurors must be on hand by 9:00 a.m. Monday morning, therefore, even though you select a delayed reporting time it may be necessary to advise you to report for the initial jury pool. If Option 2 is preferred, you will be notified when and where to pick up a pager. Please designate the shortest time within which you can report for jury duty and a preferred location for picking up your pager between the hours of 9:00 a.m. and 2:00 p.m. You will be advised of the actual required pick up time and place."

Upon receipt of the completed Jury Duty Acknowledgment forms, a court administrator will determine whether a sufficient number of potential jurors have agreed to report directly for jury duty and whether there are enough individuals willing to respond promptly upon being paged. These jury pool requirements must be first met, and individuals will be randomly selected where insufficient volunteers are identified. The randomly selected individuals will be properly notified as to the requirements for jury duty, despite the options they may have requested when completing the Jury Duty Acknowledgment form.

Figure 4:
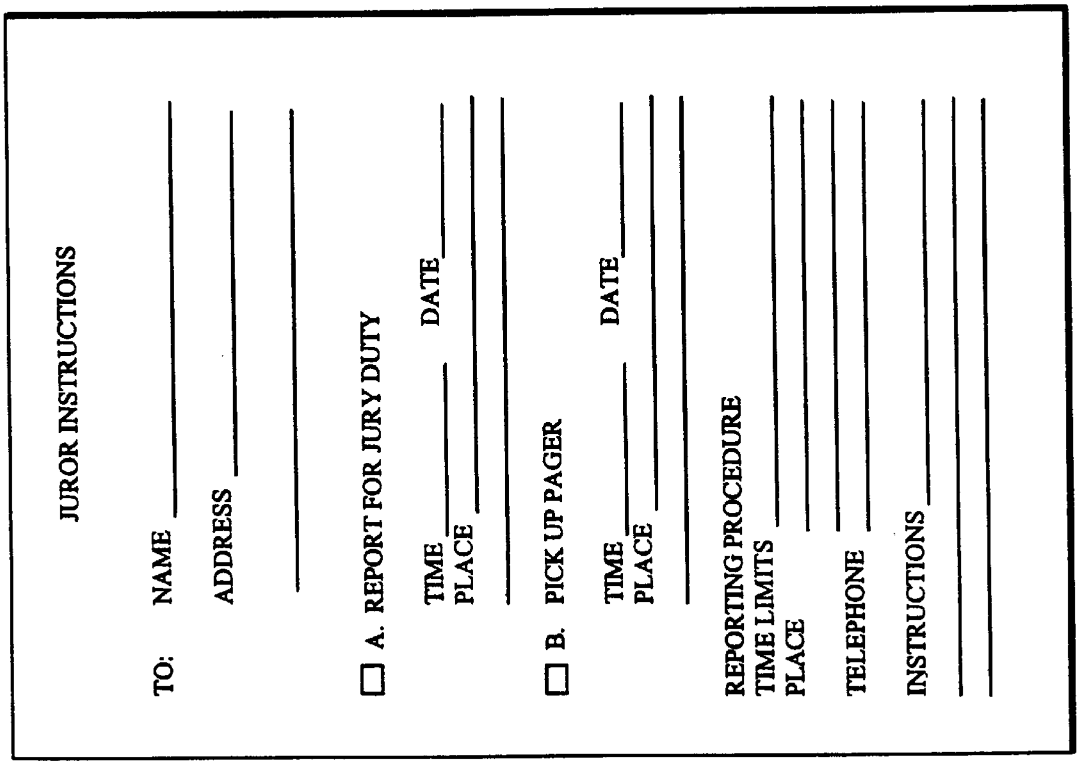
FIG. 4 is a sample Juror Instructions form.

After the Jury Duty Acknowledgment forms are evaluated, the court administrator will send each potential juror a list of Juror Instructions. An exemplary list of Juror Instructions is shown in FIG. 4. The list includes a variety of alternatives, for example, "A—REPORT FOR JURY DUTY AT [specific time] and [place]" or "B—PICK UP PAGER [number] at [specific location, for example, a local bank] by [specific time frame]". The Juror Instructions also designate the place, time limits and telephone number for picking up the pager 12. The selection process discussed above, as well as the required correspondence, may be readily computerized to expedite and standardize procedures while maintaining random selection requirements.

On the date specified for jury duty, the potential juror will either report directly to the courthouse or pick-up a designated pager 12. When the potential juror arrives at the designated location to pickup a pager 12, the potential juror is required to sign a Pager Delivery Record (See FIG. 5) and pickup the specified pager 12 with Pager Instructions (See FIG. 6).

The Pager Instructions may include the following instructions, although other instructions may be included without departing from the spirit of the present invention:

You are responsible for the care and operation of his pager.

1. Activation must occur within five minutes of the specified pickup time. This pager must be with you or within your hearing at all times.
2. When paged, you must acknowledge (turn switched to on) within five minutes and proceed immediately to the courthouse at __ to arrive within __ minutes. Should there be any delays, you must telephone the court administrator's office at __ within your time limit to avoid action by the sheriff's office.

The pickup time it is then recorded on the Pager Delivery Record by an individual responsible for releasing the pagers 12. The responsible individual records the pickup time on the Pager Delivery Record opposite the pager number. The Pager Delivery Record also provides space for the potential juror's signature and the required pager 12 pickup time frame.

At this time the potential juror is required by the Pager Instructions to activate the pager 12. This is done by moving the activation switch 16 to on (See FIG. 1). This signals the Master Pager Control Panel 14 located at the courthouse, and a light 18 indicating receipt and activation of the specific pager number is lighted on the Master Pager Control Panel 14 (See FIG. 1). While switching the pager 12 to on notifies the Master Pager Control Panel 14 in accordance with the preferred embodiment of the present invention, other techniques for notifying the Master Pager Control Panel may be employed without departing from the spirit of the present invention.

Figure 8:
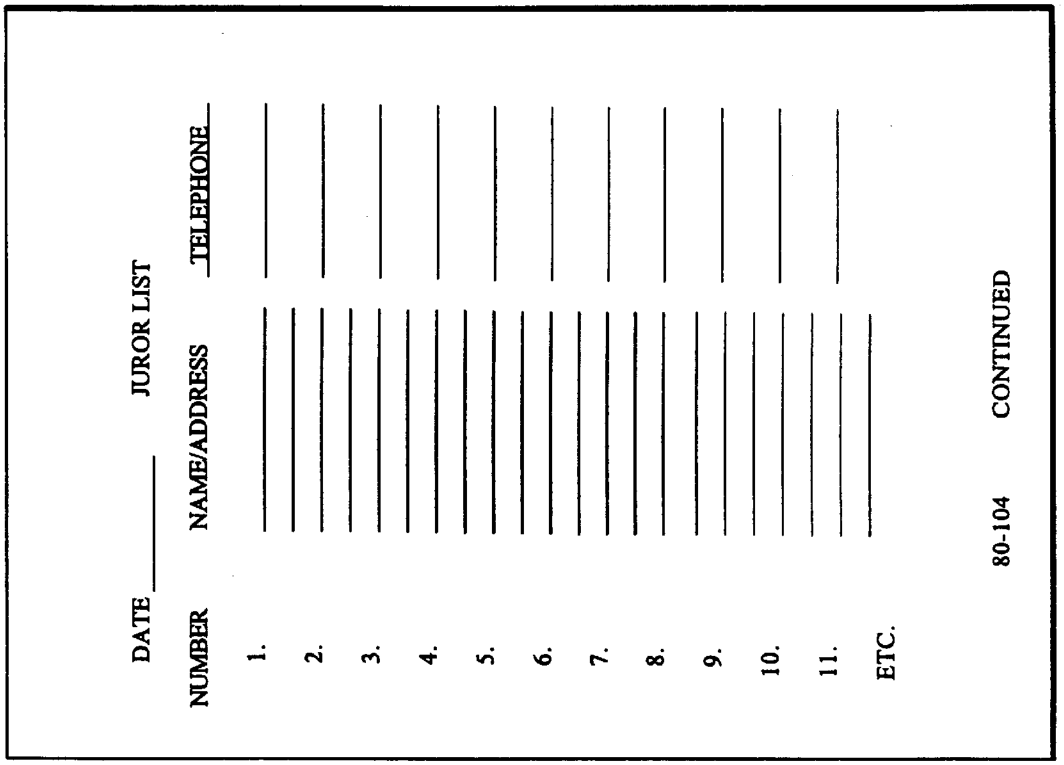
FIG. 8 is a sample Juror List for use in maintaining a record of potential jurors.
Figure 7:
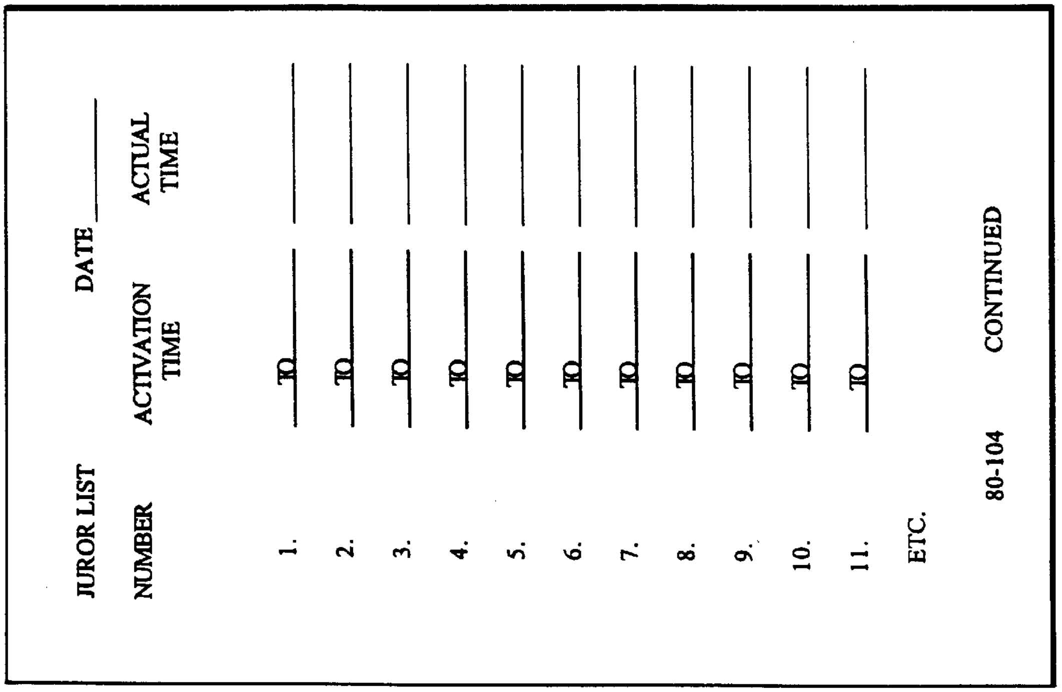
FIG. 7 is a sample Juror List for use in the distribution of pagers.

Activation of the pager 12 is noted by the operation manager of the Master Pager Control Panel 14 and may be checked against a Juror List (See FIG. 7) providing the pager number and the time frame within which the pager 12 is to be activated consistent with the instructions mailed to each potential juror. If the activation of the pager 12 is within the specified time limits, no further action by the courthouse is required. Should there be no activation light within the specified time limit for a specific pager number, a telephone contact will be initiated using the Administrators Juror List (See FIG. 8). Should this fail, the sheriff's department is requested to follow-up as is current practice with no-show jurors. This procedure will be followed for any pager 12 not activated within the time schedule by the corresponding potential jurors.

Figure 9:
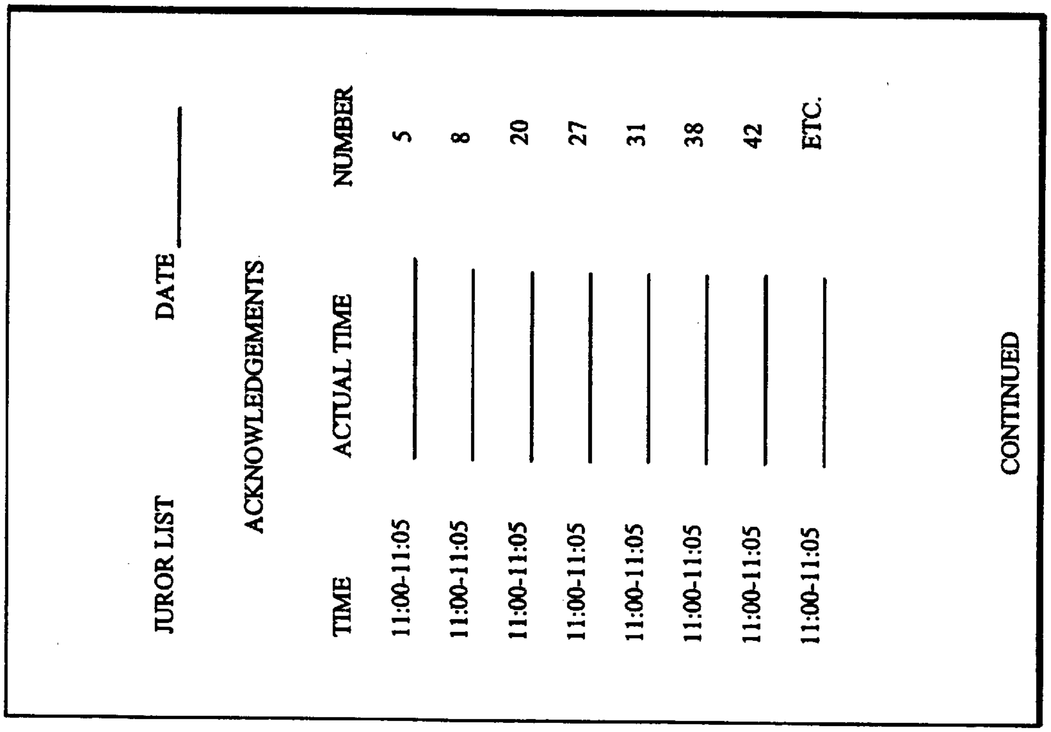
FIG. 9 is a sample Juror List Acknowledgments form.

As juries are called by the judges, the waiting room pool is replaced by paging additional potential jurors within the longest practical time frame based on the advice of judges. The need for paging additional potential jurors will be developed over time based upon the volume of the courthouse and the needs of specific judges. As additional potential jurors are required in the jury room, the Master Pager Control Panel operator initiates pagers as required. The specified pagers 12 are signaled by pager switches 20 (See Master Pager Control Panel in FIG. 1) at specified times for specified pager numbers. The Juror Acknowledgment List (See FIG. 9) reviewed by the Master Pager Control Panel operator includes response time limits monitored by the operator. A potential juror's response after being paged is checked or reported as necessary in the same manner as was done for pager activation.

After a specific pager 12 has been signaled by the Master Pager Control Panel operator, the potential juror will hear, see or feel the activated pager 12. At this time, the potential juror is required to acknowledge the page by moving the activation switch 16 to turn off the pager 12. By turning the pager 12 off, a light 22 on the Master Pager Control Panel 14 (See FIG. 1) is activated indicating that the potential juror has turned off the pager 12 in response to the page sent by the Master Pager Control Panel 14. While turning off the pager 12 is used in accordance with a preferred embodiment of the present invention as a technique for acknowledging the receipt of a page, other acknowledgment techniques may be employed without departing from the spirit of the present invention.

This acknowledgment light 22 is observed by the operator, who notes the time on the Juror Acknowledgment List provided by the court administrator. Should there be no acknowledgment within a predetermined time limit, the operator is required to initiate a telephone call follow-up using the Juror List. If this does not get results, the information is reported to the court administrator, and the sheriff's office is requested to follow-up as is currently done for no-show potential jurors.

Figure 10:
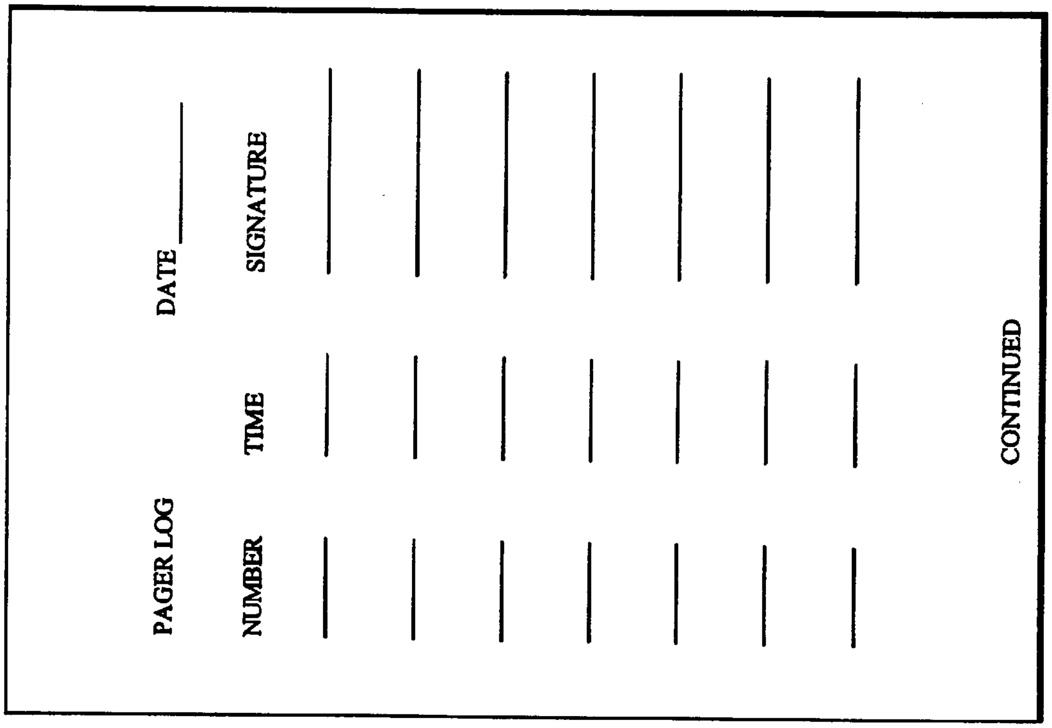
FIG. 10 is a sample Pager Log.

The potential juror, having been paged, then reports to the courthouse within the agreed upon time. Upon arriving, the pager 12 is logged in at a security booth (See FIG. 10), and the potential juror is directed to the juror waiting room where the responsible person logs the potential juror in on their copy of the Juror's List (See FIG. 7). Once the pager 12 has been received, it may be inspected, repaired if necessary and eventually returned with a new instruction sheet to the distribution location for reassignments.

With recent advances in technology it may be possible to incorporate GPS (global positioning systems) within the pages. In this way, the potential juror's whereabouts may be monitored in the event they do not return to the courthouse when requested.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A jury paging notification system, comprising:

a plurality of juror pagers to be carried by potential jurors;

a pager control panel monitoring each of the plurality of juror pagers, the pager control panel including means for paging potential jurors as they are required at a courthouse based upon predetermined acceptable time periods for response, an acknowledgment signal and a receipt/activation signal;

each of the juror pagers including an activation switch which when turned off activates the acknowledgment signal to indicate that a juror has received a page requiring presence at the courthouse; and wherein potential jurors carrying a juror pager are permitted to go on with their regular lives and leave the courthouse based upon the understanding that attendance at a courthouse is required within a specified time period after being paged, and the location and accessibility may jurors is monitored via activation of the acknowledgment signal and interaction with the receipt/activation signal associated with pager control panel.

2. The jury paging notification system according to claim 1, wherein turning on a specified one of the juror pagers signals the pager control panel that the specified juror pager has been turned on and is active.

3. The jury paging notification system according to claim 1, wherein the pager control panel is activated to page a specified one of the juror pagers when that potential juror's attendance is required at the courthouse.

4. A jury paging notification system, comprising the following steps:

assigning a specified juror pager to each potential juror such that potential jurors are permitted to go on with their regular lives based upon the understanding that attendance at a courthouse is required within a specified time period after being paged;

monitoring the juror pagers with a pager control panel, the pager control panel includes means for paging potential jurors as they are required at a courthouse based upon predetermined acceptable time periods for response, an acknowledgment signal and a receipt/activation signal; and paging potential jurors when their attendance at the courthouse is required, and requesting that potential jurors turn off an activation switch on the assigned juror pager as acknowledgment of their receipt of the page requiring presence at the courthouse.

5. The jury paging notification system according to claim 4, further including the step of turning the juror pager on to indicate that a specified one of the juror pagers has been activated by a potential juror.

6. The jury paging notification system according to claim 5, wherein the step of monitoring includes paging a specified one of the juror pagers when that potential juror's attendance is required at the courthouse.

7. The jury paging notification system according to claim 4, further including the step of preliminarily surveying potential jurors to determine the availability of potential jurors for jury duty.

8. The jury paging notification system according to claim 4, wherein the step of monitoring includes paging a specified one of the juror pagers when that potential juror's attendance is required at the courthouse.

* * * * *